United States Patent [19]
Beebe

[11] 3,938,015
[45] Feb. 10, 1976

[54] SCR MOTOR VOLTAGE CONTROLLER

[76] Inventor: Ronald Beebe, 32960 Parkview Drive, Fort Bragg, Calif. 95437

[22] Filed: Apr. 5, 1974

[21] Appl. No.: 458,127

[52] U.S. Cl. ............................. 318/139; 318/341
[51] Int. Cl.[2] ........................................... H02P 7/06
[58] Field of Search ............................. 318/139, 341

[56] References Cited
UNITED STATES PATENTS

| | | | |
|---|---|---|---|
| 3,223,909 | 12/1965 | Sensing et al. | 318/139 |
| 3,437,826 | 4/1969 | Kelley | 318/341 X |
| 3,588,654 | 6/1971 | Balazs | 318/341 X |
| 3,716,767 | 2/1973 | Kuriyama et al. | 318/139 |
| 3,753,155 | 8/1973 | Opal et al. | 318/341 X |

Primary Examiner—James R. Scott
Assistant Examiner—W. E. Duncanson, Jr.
Attorney, Agent, or Firm—Berman, Bishoff & Platt

[57] ABSTRACT

A voltage control circuit for a motor, such as a vehicle motor, energized from a battery. The circuit utilizes a commutating capacitor and a main pass SCR, and includes a separate capacitor charging circuit which always charges the capacitor to twice the unloaded battery voltage, the capacitor being charged whether or not the main pass SCR is on. The circuit operates at a fixed pulse frequency and has a manually operable potentiometer which controls the pulse width, whereby the effective DC voltage output to the motor is correspondingly controlled.

10 Claims, 9 Drawing Figures

SCR MOTOR VOLTAGE CONTROLLER

This invention relates to motor control circuits, and more particularly to motor control circuits of the commutating capacitor type employed to control the effective DC voltage applied to a load, such as a vehicle motor.

A main object of the invention is to provide a novel and improved motor control circuit for controlling the effective DC voltage to a load such as a vehicle motor or the like, the control circuit being of the type utilizing a commutating capacitor with means to charge the capacitor, the circuit including a main pass SCR switching device and the circuit being arranged to charge the capacitor whether or not the main pass SCR switching device is on, whereby the charging of the capacitor is independent of the state of the SCR switching device, and whereby commutation can occur over a wide range of loading conditions, including a condition where the motor has stalled.

A further object of the invention is to provide an improved motor control circuit of the type employing a commutating capacitor for energizing a load, such as a vehicle motor, from a battery source, utilizing a main pass SCR switching device, the circuit operating at a fixed pulse frequency and employing means to vary the pulse width, to thereby vary the effective voltage applied to the motor, the circuit thereby providing smooth control of the motor speed and preventing jerky operation even at very low speeds.

A still further object of the invention is to provide an improved motor control circuit of the above-mentioned type wherein the main pass SCR switching device is turned on at different points in time over a range of such points for a given cycle of operation, depending on the desired motor speed, whereby to control the width of the energizing pulses applied to the motor and to thereby control the effective voltage applied to the motor, enabling the motor speed to be smoothly controlled and providing stable and efficient operation over a wide range of speeds.

Further objects and advantages of the invention will become apparent from the following description and claims, and from the accompanying drawings, wherein:

Motor control circuits of the capacitive commutating type, namely, employing capacitive turn-off of the SCR switch elements thereof, have been employed to control the effective DC voltage to various types of loads, for example, in golf carts, electric cars, and the like. A primary purpose of the present invention is to provide an improved control circuit of this type, which may be employed either with SCR elements or other devices equivalent thereto.

Previously employed systems for turning the SCR elements off utilize either transformers, inductors, capacitors or a combination of all three. These previously employed systems produce a fixed pulse width, and in order to vary the effective DC voltage furnished to the associated motor, the frequency must vary. This means that at low DC level output the frequency is very low, producing large energy pulses at a slow rate, which causes a jerky motion or action of the motor, which is quite objectionable.

Previously employed capacitive turn-off circuits use either transformers or inductors supplied with current by the main pass SCR to develop a charge on the associated capacitor. This system of operation has at least two drawbacks, namely, (1) the main pass SCR must turn on for a minimum fixed time before the capacitor is charged to the level required to cause it to provide the turn-off action, and (2) if the load is in a condition that requires a large amount of current, (for example, a stalled motor), the battery voltage will drop, and this will not allow the circuitry to charge the capacitor sufficiently to allow it to turn off the associated SCR elements.

The system of the present invention utilizes a separate capacitor charging circuit which always charges the capacitor to twice the unloaded battery voltage, and it charges the capacitor whether the main pass SCR is on or not, thus avoiding the above-described disadvantageous features. The system of the present invention operates at a fixed frequency and the pulse width is varied to thereby cause the effective DC voltage output to vary.

Figure 2:
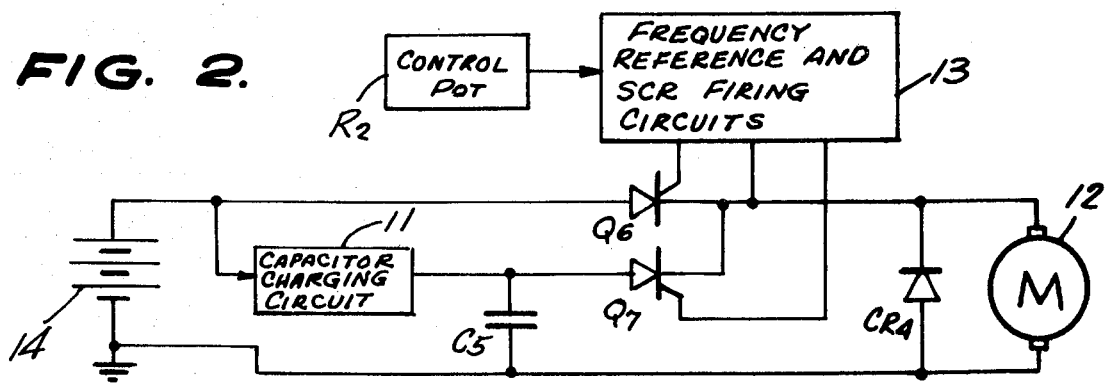
FIG. 2 is a block diagram showing portions of the control circuit of FIG. 1 in generalized form.

Thus, referring to FIG. 2, showing a generalized block diagram of a system according to the present invention, the main pass SCR $Q_6$ is turned on at different periods of time in the operating cycle of the system, depending on the desired motor speed. The SCR element $Q_6$ is turned off by turning on the SCR switch element $Q_7$. When element $Q_7$ turns on, the large potential that the commutating capacitor $C_5$ is charged to backbiases the SCR element $Q_6$, allowing said element $Q_6$ to turn off. The commutating capacitor $C_5$ is maintained charged by the capacitor charging circuit designated generally at 11.

The capacitor $C_5$ will supply current to the motor, shown at 12, until the motor voltage drops to a specific limiting value, for example, approximately 0.8 volt negative. At this time, the "fly-back" rectifier $CR_4$, will conduct and supply current to the motor. When the recitifier $CR_4$ begins to conduct, it allows the SCR element $Q_7$ to turn off.

The pulse width, for varying the effective DC voltage furnished to the motor 12 is varied, in a manner presently to be described, by means of a control potentiometer $R_2$ connected into a frequency reference and SCR firing circuit, designated generally at 13. The operating energy for the motor 12 is derived from a suitable storage battery shown at 14. The motor 12 is connected to the battery 14 through a circuit including the main pass SCR element $Q_6$, which is controlled in a manner presently to be described by the circuit 13 and by the SCR element $Q_7$.

Figure 1:
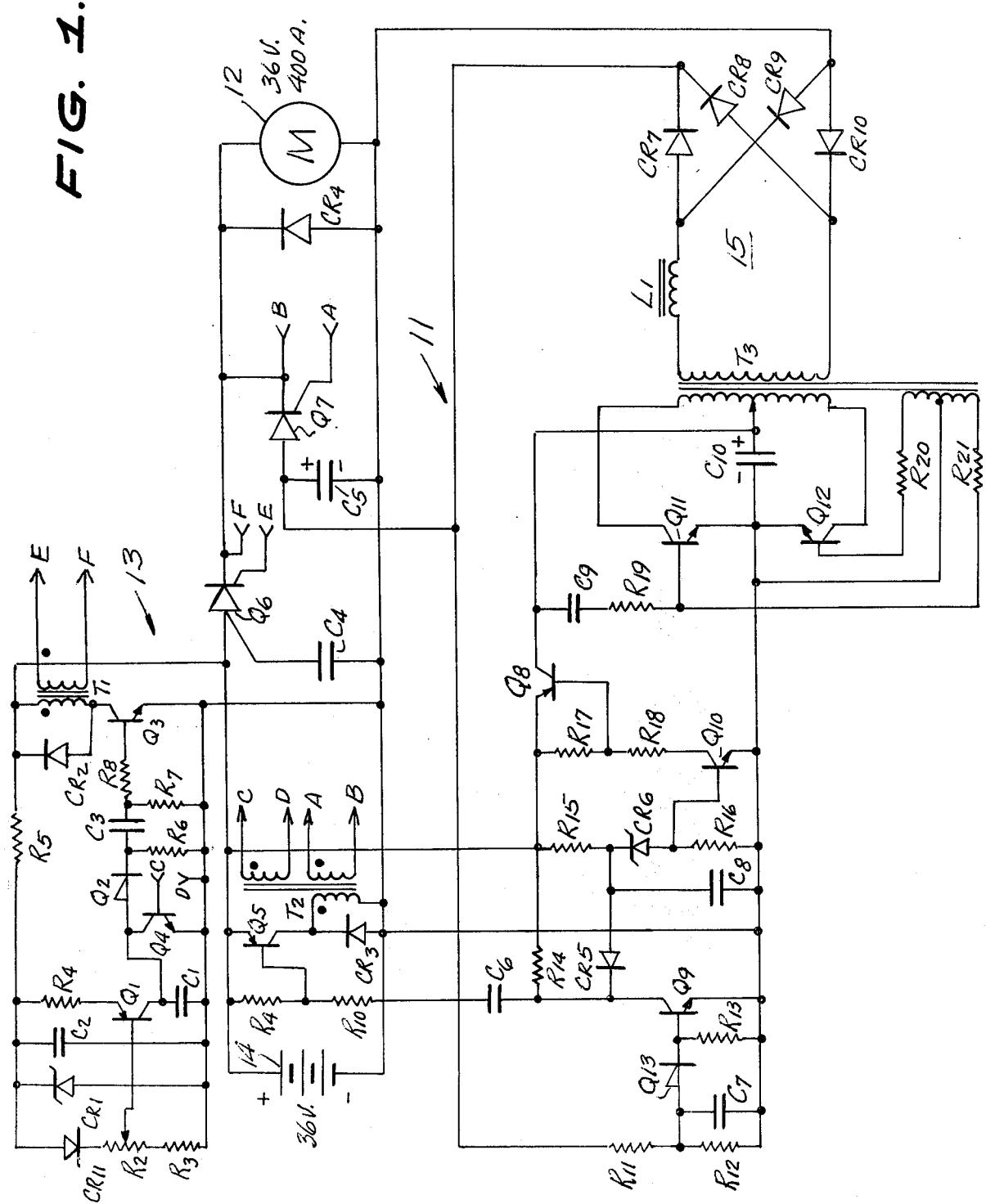
FIG. 1 is a detailed circuit wiring diagram of a typical motor control circuit constructed in accordance with the present invention.

Referring now to the detailed circuit shown in FIG. 1, the main pass SCR element $Q_6$ acts as a switch that turns on and off at a 30hz rate. The turn-off pulses are approximately 200 microseconds in duration and occur at 33 millisecond intervals. The SCR $Q_6$ may be turned on any time during the interval, but it is always turned off when the turn-off pulse occurs. The effective DC voltage that is applied to the motor is a function of the duty cycle of the SCR $Q_6$, namely, the time that it is on in proportion to its off-time.

The turn-off pulses are generated by charging the capacitor $C_5$ to approximately twice the DC source voltage, and then turning on the SCR device $Q_7$. This produces the 200 microsecond pulse that is required to turn off the SCR device $Q_6$.

The charging circuit for the capacitor $C_5$ consists of a DC to DC converter composed of transistors $Q_{11}$, $Q_{12}$, transformer $T_3$, inductor $L_1$ and rectifiers $CR_7$ through $CR_{10}$, connected in the manner shown and presently to be further described. The inductor $L_1$ limits the current flow in the circuit and establishes the charging time for the capacitor $C_5$.

When the charge on the capacitor $C_5$ reaches a level that is substantially twice the DC source, it causes a transistor $Q_{13}$ to turn on. The transistor $Q_{13}$ is of the 2N4985 type (SUS type). In this type of transistor, when the voltage across it reaches 8 volts, the device turns on and the voltage drop goes down to 0.9 volts and it remains in the on state until the current through it reduces to 0. The waveform of the voltage across a device of this type is graphically illustrated in FIG. 9.

When transistor $Q_{13}$ turns on, this turns on transistor $Q_9$, which causes transistor $Q_{10}$ and transistor $Q_8$ to turn off. When transistor $Q_8$ turns off, it turns off the DC to DC converter, shown generally at 15.

The turn-on pulse of transistor $Q_9$ is coupled through a capacitor $C_6$ to the base of a transistor $Q_5$, the turn-on pulse being differentiated by means of the capacitor $C_6$ and resistors $R_9$ and $R_{10}$. Transistor $Q_5$ drives a transformer $T_2$ with a pulse. The transformer $T_2$ has the two secondaries with respective outputs shown at A-B and C-D. The A-B output is used to turn on the SCR device $Q_7$, which turns off the main pass SCR device $Q_6$. The other output, namely, the C-D output is coupled to the base of a transistor $Q_4$ which resets the control circuitry.

The speed control potentiometer $R_2$ is in a voltage divider branch including a temperature compensating diode $CR_{11}$ and a resistor $R_3$ and controls a constant current circuit comprising a transistor $Q_1$ and resistor $R_4$. This constant current circuit charges a capacitor $C_1$ at a linear rate. When the voltage across the capacitor $C_1$ reaches approximately 8 volts, the transistor $Q_2$ breaks down, causing a pulse to appear at the input to transistor $Q_3$. The transistor $Q_2$ is similar to the transistor $Q_{13}$, and the voltage waveform thereacross appears in FIG. 9.

As will be seen from FIG. 1, the transistor $Q_3$ drives a transformer $T_1$. The output at the secondary winding of $T_1$ is shown at E-F. This output E-F is coupled to the control input of the main pass SCR device $Q_6$, and when such a pulse is applied, it causes said power SCR device $Q_6$ to turn on.

When the speed control potentiometer $R_2$ is adjusted in the direction of series resistor $R_3$, it causes the constant current circuit to charge the capacitor $C_1$ more rapidly, thus producing the turn-on pulses at different periods of time in the pulsing cycle.

Figure 3:
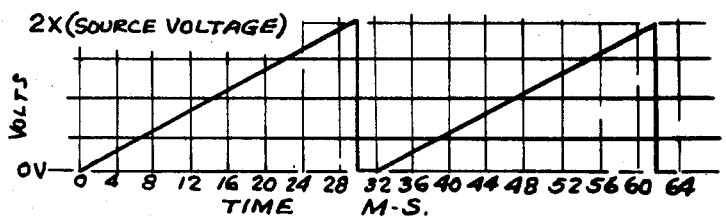
FIGS. 3 to 9 are graphs showing voltage wave forms across various portions of the circuit of FIG. 1 and under various conditions of operation.

Thus, FIG. 3 shows the voltage waveform appearing across capacitor $C_5$ as it is charged from the D-C to D-C converter 11.

Figure 4:
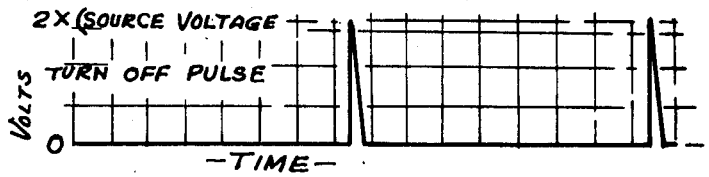

FIG. 4 shows the turn-off pulse which is developed when the SCR device $Q_7$ turns on and discharges capacitor $C_5$. When this pulse is applied to the cathode of the SCR device $Q_6$, it causes the device $Q_6$ to turn off.

Figure 5:
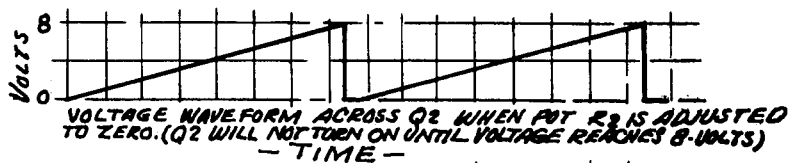

FIG. 5 shows the control voltage which appears across the transistor $Q_2$ when the potentiometer $R_2$ is adjusted to a O position. It will be noted that the SUS device $Q_2$ will not turn on until the voltage thereacross reaches 8 volts. The voltage across the $Q_2$ device is a function of the setting of the potentiometer device $R_2$. In FIG. 5 it is seen that the waveform shows that the voltage just reaches the 8-volt level at the time of reset, and therefore the power SCR device $Q_6$ never turns on.

Figure 6:
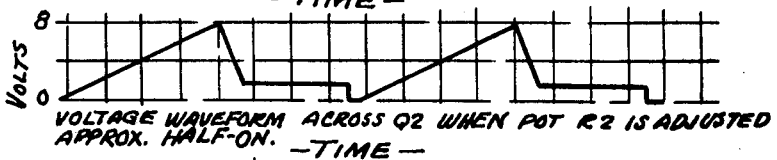
Figure 7:
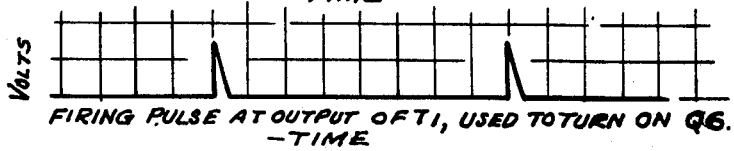

FIG. 6 shows the control voltage across the SUS device $Q_2$ when the potentiometer $R_2$ is adjusted to an approximately "half-on" position. The voltage across the device $Q_2$ reaches the 8-volt level in 16 milliseconds, and the transistor $Q_2$ turns on, causing the transistor $Q_3$ to produce a pulse to the transformer $T_1$, which in turn develops a pulse in the secondary at the output E-F which is transmitted to the control gate of the SCR device $Q_6$, turning this device on. The firing pulse at the secondary output E-F is graphically illustrated in FIG. 7.

Figure 8:
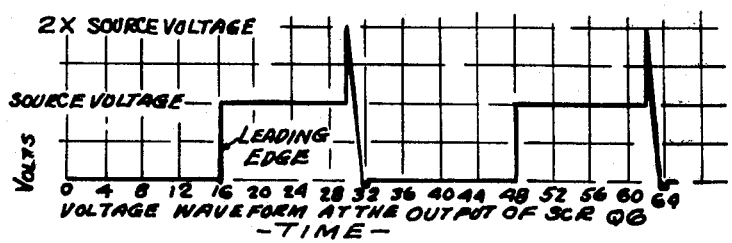

FIG. 8 shows the output waveform which appears across the motor 12, namely, at the output of the SCR device $Q_6$. The leading edge of this waveform is adjustable in time (in relation to the pulse cycle), depending upon where the control potentiometer $R_2$ is set.

As above mentioned, the transistors $Q_{11}$ and $Q_{12}$ form part of a generally conventional D-C to D-C converter circuit. The circuit is self-excited, and when power supply voltage is applied to the primary center tap of the transformer $T_3$, the circuit oscillates and produces a square wave across its output winding.

The power is supplied to the center tap of the primary of transformer $T_3$ by turning on (into saturation) the transistor $Q_8$. The emitter of transistor $Q_8$ is connected to the positive terminal of the power supply battery 14, and when the transistor $Q_8$ is turned on, its collector will rise to the same potential as the emitter.

The inductor $L_1$ is connected in series with the secondary of transformer $T_3$, and it limits the current flow in the secondary, because the voltage waveform is substantially square-waved. The square wave output of transformer $T_3$ is rectified by the full-wave rectifier assembly consisting of rectifiers $CR_7$ through $CR_{10}$. The resulting DC voltage is used to charge capacitor $C_5$.

Figure 9:
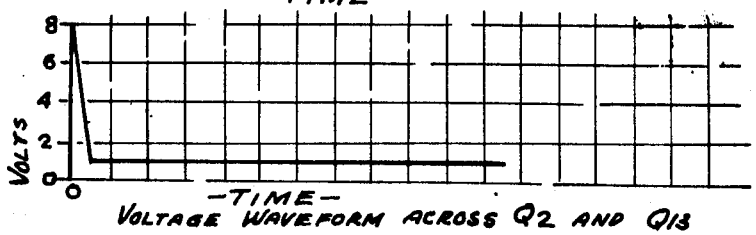

When the DC voltage across capacitor $C_5$ reaches substantially twice the power supply voltage, the SUS transistor $Q_{13}$ will turn on and the voltage drop thereacross will change from 8.0 volts to 0.9 volts substantially in the manner shown in FIG. 9. This allows capacitor $C_7$ to discharge into the base of transistor $Q_9$, thus driving it into saturation. When transistor $Q_9$ turns on, its collector voltage will drop to almost zero volts, thus removing the drive voltage from the base of transistor $Q_{10}$, forcing it to turn off. The base current of transistor $Q_8$ must flow through the transistor $Q_{10}$ and, therefore, when transistor $Q_{10}$ turns off, transistor $Q_8$ must also turn off.

When the transistor $Q_8$ turns off, the power supply voltage is removed from the center tap of the primary of transformer $T_3$, thus turning off the DC to DC converter 15. When transistor $Q_9$ was turned on, a pulse was coupled through the capacitor $C_6$ to a resistor network comprising resistors $R_9$ and $R_{10}$, including a connection at their junction to the base of transistor $Q_5$. The pulse supplied to the base of transistor $Q_5$ causes said transistor $Q_5$ to turn on and produce a pulse in the primary circuit of a transformer $T_2$, and consequently in the secondary windings thereof having the respective outputs shown at C-D and A-B. The A-B output is coupled to the gate and cathode of the SCR device $Q_7$. The pulse received by the SCR device $Q_7$ causes it to be turned on, whereupon the capacitor $C_5$ discharges through the SCR device $Q_7$ to the cathode of the main pass SCR device $Q_6$, causing device $Q_6$ to turn off.

When the capacitor $C_5$ discharges to substantially zero volts, the SUS transistor $Q_{13}$ turns off and allows the DC to DC converter circuit to turn on and recharge the capacitor $C_5$, thus beginning another cycle.

The cycle of charging and discharging the capacitor $C_5$ in effect becomes the master clock of the system. One cycle will require approximately 30 milliseconds. When the transistor $Q_5$ turned on and produced a pulse at the A–B secondary of transformer $T_2$, a pulse was also produced at the C–D secondary. The C–D secondary pulse is coupled to the base of the transistor $Q_4$, and this pulse causes it to turn on and reset capacitor $C_1$ to substantially 0 volts.

The capacitor $C_1$ is charged from a variable constant current source comprising the control potentiometer $R_2$, the transistor $Q_1$ and the resistor $R_4$. The capacitor $C_1$ is charged linearly and is reset to zero every 30 milliseconds, when the reset pulse occurs. The charge rate is controlled by the potentiometer $R_2$. When the charge of the capacitor $C_1$ reaches 8.0 volts, the SUS transistor $Q_2$ (see FIG. 9) turns on, and the voltage drop thereacross changes from 8.0 to 0.9 volts, thus producing a pulse at the base of transistor $Q_3$. Transistor $Q_3$ turns on and produces a pulse at the secondary E-F of transformer $T_1$. This pulse is coupled to the power SCR device $Q_6$, as above mentioned, and causes it to turn on. The SCR device $Q_6$ remains on until the turn-off pulse from the SCR device $Q_7$ occurs, in the manner above described.

One of the main advantages of the control load system above described is that it will control large amounts of current, of the order of current up to 500 amperes, at reasonable voltages, (below 500 volts) from zero output to maximum output at an efficiency exceeding 95%. The control potentiometer is substantially linear and provides substantially direct proportionality thereof with respect to the output voltage. The turn-off pulse is generated by a separate charging circuit and is always present. The frequency is constant and only the turn-on time is variable. In proven designs according to this system, energy efficiency was maintained at 95% at all speeds, and in the proven design there were no "lock-up" effects. Complete control of the input energy was available from 0 to full speed and a power capacity up to 250,000 watts can be provided.

The following tables give the values of the parts and their functions, as employed in a specific embodiment of the circuit shown in FIG. 1:

| Capacitors | | |
|---|---|---|
| | Value | Function |
| $C_1$ | 1 mfd, 25 w.v. | Linear voltage ramp source |
| $C_2$ | 75 mfd, 25 w.v. | Filter capacitor |
| $C_3$ | 0.1 mfd, 100 w.v. | Coupling capacitor |
| $C_4$ | 2300 mfd, 50 w.v. | Inductive shunt |
| $C_5$ | 2000 mfd, 100 w.v. | Storage capacitor |
| $C_6$ | .01 mfd, 100 w.v. | Coupling capacitor |
| $C_7$ | .039 mfd, 100 w.v. | Time delay capacitor |
| $C_8$ | 0.1 mfd, 100 w.v. | Time delay capacitor |
| $C_9$ | 0.1 mfd, 100 w.v. | Coupling capacitor |
| $C_{10}$ | 100 mfd, 50 w.v. | Filter capacitor |

| Diodes | | |
|---|---|---|
| | Commercial Designation | Function |
| $CR_1$ | 1N1782 | 30-volt zener, Power Supply Regulator |
| $CR_2$ | 1N914 | Pulse suppressor |
| $CR_3$ | 1N914 | Pulse suppressor |
| $CR_4$ | 976-3184(VY100 X/S) | 25 amp. rectifier, Pulse suppressor |
| $CR_5$ | 1N914 | Coupling diode |
| $CR_6$ | 1N5230 | 4.7-volt zener, level sensor |
| $CR_7$ | 976-3100(VR$_2$ 200 X/F) | 10 amp. rectifier ⎫ |
| $CR_8$ | " | 10 amp. rectifier ⎬ full wave bridge |
| $CR_9$ | " | 10 amp. rectifier ⎪ |
| $CR_{10}$ | " | 10 amp. rectifier ⎭ |
| $CR_{11}$ | 1N914 | Temperature compensation diode |

| Resistors | | |
|---|---|---|
| | Value | Function |
| $R_2$ | 1 K, 1/4 w. | Output Control Potentiometer |
| $R_3$ | 1 K, 1/e 3. | Voltage divider |
| $R_4$ | 620 ohms, 1/4 w. | Current Limiter |
| $R_5$ | 180 ohms, 1/4 w. | Current Limiter |
| $R_6$ | 1 K, 1/4 w. | D.C. restorer |
| $R_7$ | 1 K, 1/4 w. | D.C. restorer |
| $R_8$ | 1 K, 1/4 w. | Current Limiter |
| $R_9$ | 10 K, 1/4 w. | D.C. restorer |
| $R_{10}$ | 10 K, 1/4 w. | Voltage divider |
| $R_{11}$ | 47 K, 1/4 W. | Voltage divider |
| $R_{12}$ | 5.6 K, 1/4 w. | Voltage divider |
| $R_{13}$ | 10 K, 1/4 w. | D.C. restorer |
| $R_{14}$ | 3.9 K, 1/4 w. | Current source |
| $R_{15}$ | 1.8 K, 1/4 w. | Current supply |
| $R_{16}$ | 10 K, 1/4 w. | D.C. restorer |
| $R_{17}$ | 47 ohms, 1/4 w. | D.C. restorer |
| $R_{18}$ | 120 ohms, 20 w. | Current Limiter |
| $R_{19}$ | 100 ohms | Current Limiter |

| Transformers | Function |
|---|---|
| $T_1$ | Pulse Transformer |
| $T_2$ | Pulse Transformer |
| $T_3$ | Pulse Transformer |

| Inductors | |
|---|---|
| $L_1$ | Current Limiting Induction 15 m. h. |

| Transistors | | |
|---|---|---|
| | Commercial Designation | Function |
| $Q_1$ | 2N2907 | Constant current source |
| $Q_2$ | 2N4985 | SUS switch |
| $Q_3$ | 2N2222 | Switch |
| $Q_4$ | 2N2222 | Switch |
| $Q_5$ | 2N2907 | Switch |
| $Q_6$ | 400 amp. 50 v. SCR | Main Switch |
| $Q_7$ | IRC 16RC 10A | Switch |
| $Q_8$ | SDG607 | Power switch |
| $Q_9$ | 2N2222 | Switch |
| $Q_{10}$ | 2N2222 | Switch |
| $Q_{11}$ | 2N3773 | Power converter |
| $Q_{12}$ | 2N3773 | Power converter |
| $Q_{13}$ | 2N4985 | Switch |

| Power Source | |
|---|---|
| Battery 14 | 36 volts |

While a specific embodiment of an improved voltage control circuit for a motor has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A motor speed controlling system comprising in combination:
   a. a DC source;
   b. DC motor means;
   c. a main pass switch device connecting said source to said motor means;
   d. means to turn on said main pass switch device at a constant periodic rate, comprising:
      i. a constant current circuit connected to said DC source;
      ii. a turn-on capacitor;
      iii. means to charge said turn-on capacitor from said constant current circuit;
      iv. a first transformer;

v. circuit means to apply a pulse to the input of said first transformer responsive to a predetermined charge level of said turn-on capacitor; and vi. means operatively connecting said first transformer to said main pass switch device;

e. means to turn off said main pass switch device at said periodic rate after a power pulse, whereby to deliver power pulses to said motor means at said constant periodic rate, comprising:

i. a second switch device;

ii. a turn-off capacitor;

iii. a DC to DC converter operatively connected to said DC source for charging said turn-off capacitor to a trigger voltage substantially higher than that of the DC source;

iv. circuit means operatively connected to said second switch device and said turn-off capacitor acting to turn on said second switch device responsive to attainment of said trigger voltage including a second transformer operatively connected to said second switch device, a differentiating circuit drivingly connected to said second transformer and means to develop a driving pulse in said differentiating circuit responsive to the attainment of said trigger voltage;

v. circuit means to back-bias said main switch device to a turn-off state responsive to the turning on of said second switch device; and vi. means to turn off said DC to DC converter simultaneously with the turning on of said second switch device responsive to the attainment of said trigger voltage; and f. means to adjust the point of turn-on of said main pass switch device in its cycle, whereby to vary the width of the power pulses and correspondingly vary the effective voltage applied to said motor means.

2. The motor speed controlling system of claim 1, and wherein said means to adjust the point of turn-on of said main switch device comprises adjustable circuit means connecting said constant current circuit to said DC source and arranged to control the rate of charge of said turn-on capacitor.

3. The motor speed controlling system of claim 1, and wherein said constant current circuit comprises a resistor and a transistor connected in series with the turn-on capacitor and connected across the DC source, and a voltage divider network connected across the DC source and including a potentiometer, the potentiometer having an adjustable contact, and circuit means connecting said adjustable contact to the base of said transistor.

4. The motor speed controlling system of claim 3, and means to discharge said turn-on capacitor responsive to the attainment of said trigger voltage.

5. The motor speed controlling system of claim 4, and wherein said discharge means comprises a reset transistor connected across said turn-on capacitor, and means to fire said reset transistor responsive to the driving pulse of said differentiating circuit.

6. The motor speed controlling system of claim 5, and wherein the means to fire said reset transistor comprises an output winding on said first-named transformer, and circuit means connecting said output winding between the base and emitter of said reset transistor.

7. A motor speed controlling system comprising in combination:

a. a DC voltage source;

b. DC motor means;

c. circuit means including a main pass siwtch device connecting said source to said motor means;

d. means to turn on said main pass switch device at a constant periodic rate; and e. means to turn off said main pass switch device at the same periodic rate, including:

i. a turn-off capacitor operatively connected to said main pass switch device; and ii. means to charge said turn-off capacitor to a voltage substantially higher than said source voltage, independently of whether said main pass switch device is on or off;

so that the width of the power pulses and the effective voltage applied to said motor means may be varied over a wide range of loading conditions.

8. The motor speed controlling system set forth in claim 7 wherein said turn-off capacitor is charged to a voltage equal to approximately twice the source voltage.

9. The motor speed controlling system set forth in claim 7 wherein the means to turn off said main pass switch device further comprises a second switch device interconnected with said main pass switch device so that when said second switch device conducts, said main pass switch device is turned off and circuit means interconnecting said turn-off capacitor with said second switch device so that when said turn-off capacitor reaches said substantially higher voltage, said second switch device conducts.

10. The motor speed controlling system set forth in claim 9 wherein said means to charge said turn-off capacitor comprises a DC to DC converter and further including circuit means to turn off said DC to DC converter simultaneously with the conduction of said second switch device.

* * * * *